BIPOLAR INTEGRATED SHIFT REGISTER

Filed July 24, 1967

INVENTOR
CARL E. RUOFF

BY Charles P. Neary

AGENT

United States Patent Office 3,497,718

Patented Feb. 24, 1970

3,497,718

BIPOLAR INTEGRATED SHIFT REGISTER

Carl E. Ruoff, Apalachin, N.Y., assignor to International Business Machines Corporation, Armonk, N.Y., a corporation of New York Filed July 24, 1967, Ser. No. 655,373
Int. Cl. H03k *23/08;* G11c *19/00*
U.S. Cl. 307—221 10 Claims

ABSTRACT OF THE DISCLOSURE

This is an improved bipolar integrated shift register logic circuitry which is particularly adapted for fabrication in accordance with silicon monolithic microcircuit technology. The apparatus comprises an oscillator driver for a binary counter for producing squarewave outputs that are one hundred-eighty degrees out-of-phase with each other and in turn functions as the driving means for the shift register. The shift register per se is comprised of a plurality of series-connected cells with each cell having two bipolar transistors in latch-type circuit configuration and utilizing a base-emitter charge storage principle to establish the "on" or "off" condition of the latch.

BACKGROUND OF THE INVENTION

Field of the invention

This invention relates generally to an improved data storage means; and more particularly, to an improved high-speed shift register which is low in cost and adapted for fabrication in accordance with silicon monolithic microcircuit technology.

Prior art

Shift registers are widely used in data processing apparatus, primarily for the temporary storage of data in digital form. As circuit developments and packaging techniques advance in the electronic art concerned with the design of such apparatus, the requirements for speed of operation and for fabrication in compact, integrated form at a low cost become more severe. A phenomenal growth in the use of silicon-integrated circuits over the past few years can be attributed primarily to the low cost. While economic motivation has emerged as the dominant factor, other factors such as small size, weight, and increased reliability have also contributed. The use of the metal oxide silicon-integrated circuit is stimulating an electronic revolution comparable to the advent of the transistor.

SUMMARY OF THE INVENTION

It is a primary object of the present invention to provide an improved shift register which is particularly well suited to fabrication by the use of silicon monolithic technology, which is low in cost, and which is compatible with and operates reliably at the speed of other logical circuits with which it is utilized.

This object is achieved in the preferred embodiment of the present invention through a plurality of identical circuits in which two of such circuits are required to store each bit of information that is contained in the shift register. A two-phase clock is required to operate the shift register and a source of data must be available with which to insert information into the shift register. Clock pulses are supplied from an oscillator-driven binary counter which produces two squarewave outputs that are out-of-phase with each other. An emitter follower is used as an amplifier to drive each of the phase inputs of the shift register.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
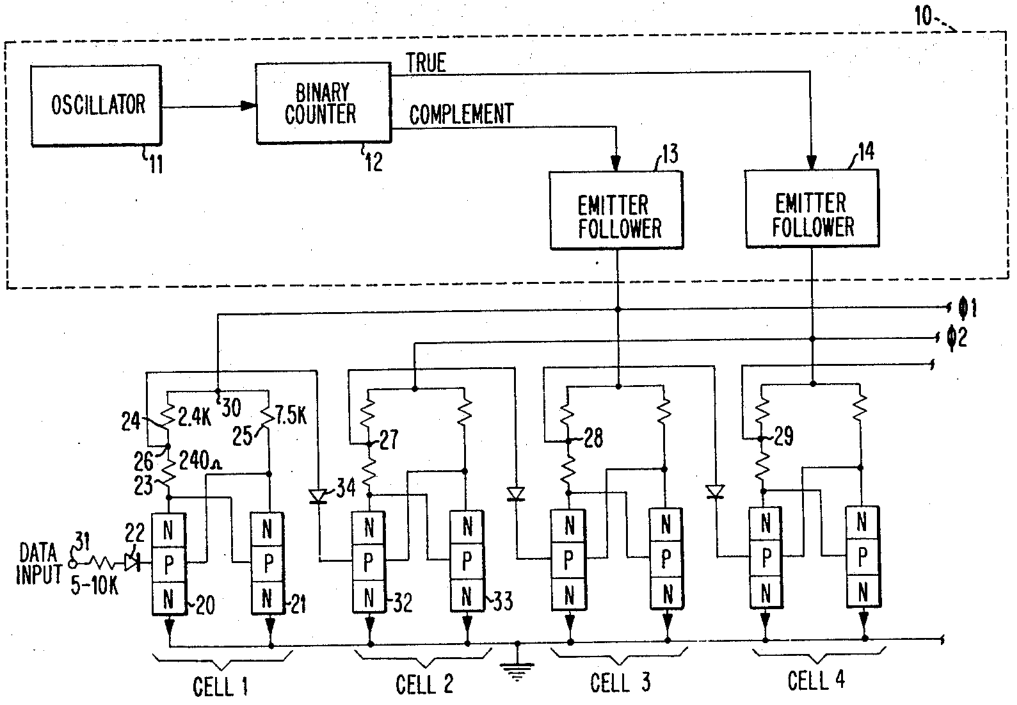
FIG. 1 is a schematic logic diagram of a preferred embodiment of the improved register and its control circuit.
Figure 2:
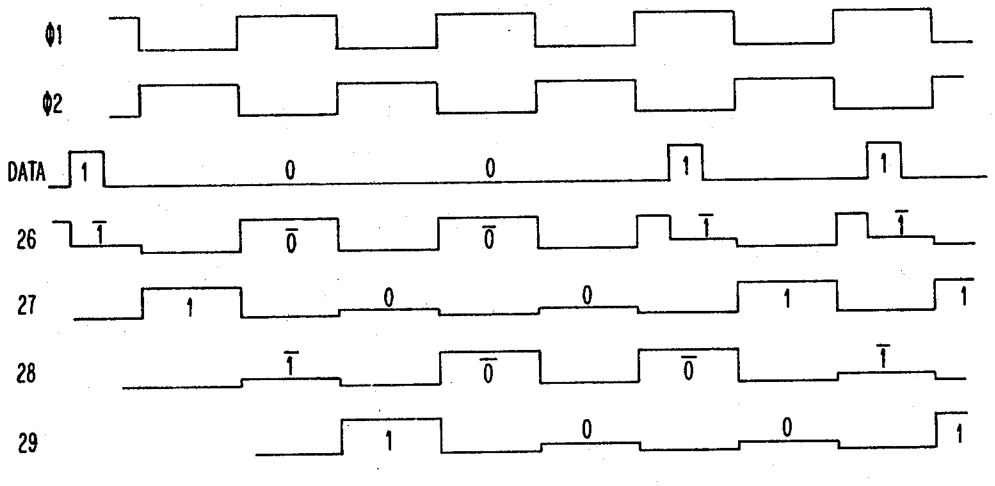
FIG. 2 shows the preferred waveforms which illustrate the operation of the circuit of FIG. 1.

In FIG. 1 the shift register comprises a plurality of bistable stages or cells of which only the first four are shown. Two cells are required for each bit of information stored in the shift register.

The shift register, while conventional in function, is unique in structural characteristics and particularly adapted for fabrication in accordance with silicon monolithic microcircuit technology. Each cell is arranged in bistable latch circuit configuration as, for example, cell 1 which comprises two transistors 20 and 21, a diode 22 in the input circuit, and appropriately chosen voltage controlling resistors 23, 24 and 25. The base and collector electrodes of the transistors 20 and 21 are cross coupled in the usual manner to provide two stable states of operation.

The clock 10 includes an oscillator 11 which drives conventional binary counter 12 that produces two squarewave outputs at one half of the frequency of the oscillator 11. The binary counter 12 outputs are out-of-phase with each other and are herein identified as $\phi 1$ and $\phi 2$. Emitter followers 13 and 14 are used as an amplifier to drive the $\phi 1$ and $\phi 2$ inputs to the shift register.

In the preferred embodiment, the $\phi 1$ and $\phi 2$ signals are at either zero volts or six volts or in transition between the two levels. The signals at the output nodes 26, 27, 28 and 29 of the register cells are at either zero volts, plus two-tenths volt, or plus one and three-tenths volts. The zero-volt level is the dead time voltage, or, in other words, the phase of the cell is at zero volts. The plus two-tenths volt indicates a "zero" condition, and the plus one and three-tenths volts indicate a "one" condition in conformity with the conventional bistable system of notation. At the output of the shift register a simple inverter (not shown) is normally used to translate back to the zero-volt and plus six-volt signal levels.

A cell circuit of the shift register is designed such that as, for example, when the phase one voltage at point 30 goes from a zero-volt level to a plus six-volt level, transistor 21 turns "on" if the voltage level at the data input terminal 31 is at zero volts. This condition is obtained by selection of the resistors 23, 24 and 25 such that the combined resistance of resistors 23 and 24 is approximately one third of the resistance value of the resistor 25. If, on the other hand, the data input terminal 31 is at an up level when the phase one voltage goes to an up level, transistor 20 is forced to an "on" condition and transistor 21 remains in an "off" condition.

Information is shifted from a cell to the next succeeding cell in the manner now to be described. If transistor 20 is "off" during the time the phase one voltage is at an up level, current will flow into the base of transistor 21 and also into the base of transistor 32. Consequently, transistor 21 is in an "on" condition and the base-emitter junction of transistor 32 has a stored charge since, effectively, transistor 32 is in an "on" condition; but the phase two voltage is at its zero voltage level and no collector current will flow through transistor 32. It takes a finite time for the stored charge to recombine in the base region of transistor 32 so that when the phase two voltage goes to its up or plus six-volt level as the phase one voltage goes to its down or zero-volt level, transistor 32 is in an "on" condition and cell 2 remains latched in a state wherein transistor 32 is "on" and transistor 33 is "off."

If, during the time that the phase one voltage is at an up level and transistor 20 is "on" no current or charge is stored in the base-emitter junction of transistor 32, cell 2 will latch in an up condition at the beginning of phase two voltage going to an up condition according to the resistance ratio of resistors 23 and 24 as hereinbefore pointed out. More particularly, transistor 33 will turn "on" and transistor 32 will remain "off." In the above-described manner, information is propagated down the series-connected cells of the shift register. The information is inverted in polarity by each cell so that each pair of cells stores the information at the true value of the data. As previously pointed out, a pair of cells is required to store and shift a single bit of information. The diodes used for intercoupling the cells, as for example diode 34, perform a steering function such that the information will propagate from the left-hand circuitry of the register to the right-hand circuitry.

There has been shown the structure and operation of a latch-type bistable circuit to store information and to shift the information as stored. It has also been pointed out how the use of a diode, as for example diode 34, is utilized for steering functions. It is particularly pointed out that the design of the latch circuits is such that the latch will always turn "on," that is, the transistor 33 will be "on" and transistor 32 will be "off" when the power of the corresponding phase voltage is switched to an "on" or up condition. The circuitry as herein described makes use of the base-emitter charge storage principles to establish an "on" or "off" condition in a latch when the power is switched to an "on" condition.

In the preferred embodiment, fabrication of the transistors excludes gold doping which is normally used in higher speed switching transistors manufactured according to silicon monolithic microcircuit technology. Gold doping reduces the base storage effects, but these effects are desired and needed in the preferred embodiment to provide proper operation of the shift register. Exclusion of the gold doping will increase the device yield and enable manufacture of the circuitry at lower cost.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A data storage device comprising:

(a) a shift register having a plurality of bistable stages including first and second transistors, each having an emitter, collector and base, and wherein the two transistors of each stage are cross-connected from collector to base, (b) a source of clock pulses for switching the stages to the shift register from one stable state to the other, (c) a voltage controlling network of resistors for each stage coupling the collectors of the transistors of the stage with the source of clock pulses and wherein the portion of the voltage controlling network which couples the collector of the first transistor in each stage with the clock pulse source is tapped and electrically coupled to the base of the first transistor in the next succeeding stage, (d) the emitters of all transistors being commonly connected and to a reference potential, and (e) a source data input coupled with the base of the first stage of the shift register.

2. A data storage device as in claim 1 wherein the first and second transistors of each stage are of the NPN type.

3. A data storage device as defined in claim 2 further including a steering diode in the means electrically coupling each stage with the next succeeding stage.

4. A data storage device as in claim 3 wherein the shift register stages are monolithically fabricated.

5. A data storage device as in claim 4 wherein a base-emitter stored charge property of the first transistor in each stage controls the transfer of data and switching to the next succeeding stage.

6. A data storage system comprising:

(a) a shift register having a plurality of bistable stages including first and second transistors, each having an emitter, collector and base, wherein the two transistors from each stage are directly cross-connected collectors to base and the emitters are commonly connected and to a reference potential, (b) a voltage controlling network of resistors for each stage coupled with the collectors of the first and second transistors of each stage for controlling the operation of said bistable stages, (c) a source data input coupled to the base of the first transistors of the first stage, (d) an output for each stage being tapped to the resistors connected with the collector of the first transistor in each stage and electrically coupled to the base of the first transistor for the next succeeding stage; and (e) a first source of clock pulses connected to the voltage controlling network of resistors in the odd-numbered stages and a second source of clock pulses connected to the voltage controlling network of resistors in the even-numbered stages and operational to effect a transfer of information of data from stage to stage within the data storage system.

7. A data storage system as in claim 6 wherein the first and second transistors of each stage are of the NPN type.

8. A data storage system as in claim 7 wherein the output for each stage includes a diode device.

9. A data storage system as in claim 8 wherein the shift register stages are monolithically fabricated.

10. A data storage system as in claim 9 wherein a base-emitter stored charge property of the first transistor in each stage controls the transfer of data and switching to the next succeeding stage.

References Cited

UNITED STATES PATENTS

| | | | |
|---|---|---|---|
| 2,785,304 | 3/1957 | Bruce et al. | 328—37 |
| 2,991,374 | 7/1961 | De Miranda et al. | 307—221 |
| 3,297,950 | 1/1967 | Lee | 307—221 |

JOHN S. HEYMAN, Primary Examiner